United States Patent
Tanimura et al.

(10) Patent No.: US 10,871,737 B2
(45) Date of Patent: Dec. 22, 2020

(54) POWER SUPPLY DEVICE AND IMAGE FORMING APPARATUS INCLUDING THE POWER SUPPLY DEVICE

(71) Applicants: Takuya Tanimura, Kanagawa (JP); Kazumasa Kiyonaga, Kanagawa (JP); Yoshiteru Hagiwara, Kanagawa (JP)

(72) Inventors: Takuya Tanimura, Kanagawa (JP); Kazumasa Kiyonaga, Kanagawa (JP); Yoshiteru Hagiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/520,622

(22) Filed: Jul. 24, 2019

(65) Prior Publication Data

US 2020/0041942 A1  Feb. 6, 2020

(30) Foreign Application Priority Data

Jul. 31, 2018  (JP) ................. 2018-144595

(51) Int. Cl.
| G03G 21/00 | (2006.01) |
| G03G 15/00 | (2006.01) |
| H01G 4/38 | (2006.01) |
| H01G 4/35 | (2006.01) |

(52) U.S. Cl.
CPC ........... *G03G 15/5004* (2013.01); *H01G 4/35* (2013.01); *H01G 4/38* (2013.01)

(58) Field of Classification Search
CPC ......... G03G 15/5004; H01G 4/35; H01G 4/38
See application file for complete search history.

(56) References Cited

U.S. PATENT DOCUMENTS

| 8,023,841 | B2* | 9/2011 | Ishikawa | G03G 15/2039 399/33 |
| 2004/0037580 | A1* | 2/2004 | Ohta | G03G 15/2039 399/69 |
| 2005/0169659 | A1* | 8/2005 | Koyama | G03G 15/5004 399/88 |
| 2006/0140657 | A1* | 6/2006 | Ohta | G03G 15/20 399/69 |
| 2010/0080028 | A1* | 4/2010 | Cheng | H02M 5/4585 363/126 |

FOREIGN PATENT DOCUMENTS

| JP | 9-093982 | 4/1997 |
| JP | 2005-049544 | 2/2005 |
| JP | 2011-036002 | 2/2011 |

* cited by examiner

*Primary Examiner* — Clayton E. LaBalle
*Assistant Examiner* — Michael A Harrison
(74) *Attorney, Agent, or Firm* — Harness, Dickey and Pierce, P.L.C.

(57) ABSTRACT

A power supply device is connectable to a commercial power supply to output power to a supply destination device. The power supply device includes a filter circuit and a switching unit. The filter circuit includes a capacitor unit. The switching unit is configured to switch a capacitor capacity of the capacitor unit.

19 Claims, 6 Drawing Sheets

POWER SUPPLY DEVICE AND IMAGE FORMING APPARATUS INCLUDING THE POWER SUPPLY DEVICE

CROSS-REFERENCE TO RELATED APPLICATION

This patent application is based on and claims priority pursuant to 35 U.S.C. § 119(a) to Japanese Patent Application No. 2018-144595, filed on Jul. 31, 2018, in the Japan Patent Office, the entire disclosure of which is hereby incorporated by reference herein.

BACKGROUND

Technical Field

Aspects of the present disclosure relate to a power supply device and an image forming apparatus including the power supply device.

Related Art

There is known a technology for supplying power to an apparatus, such as a multifunction peripheral, via a filter circuit that removes noise superimposed on a commercial power supply.

For example, an alternating current (AC) input switcher is proposed to bypass a noise filter to reduce a power loss in the noise filter in energy saving mode.

SUMMARY

In an aspect of the present disclosure, there is provided a power supply device connectable to a commercial power supply to output power to a supply destination device. The power supply device includes a filter circuit and a switching unit. The filter circuit includes a capacitor unit. The switching unit is configured to switch a capacitor capacity of the capacitor unit.

In another aspect of the present disclosure, there is provided an image forming apparatus including the power supply device. The image forming apparatus is the supply destination device.

In still another aspect of the present disclosure, there is provided a power supply device connectable to a commercial power supply to output power to a supply destination device. The power supply device includes a filter circuit and switching means. The filter circuit includes a capacitor unit. The switching means switches a capacitor capacity of the capacitor unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
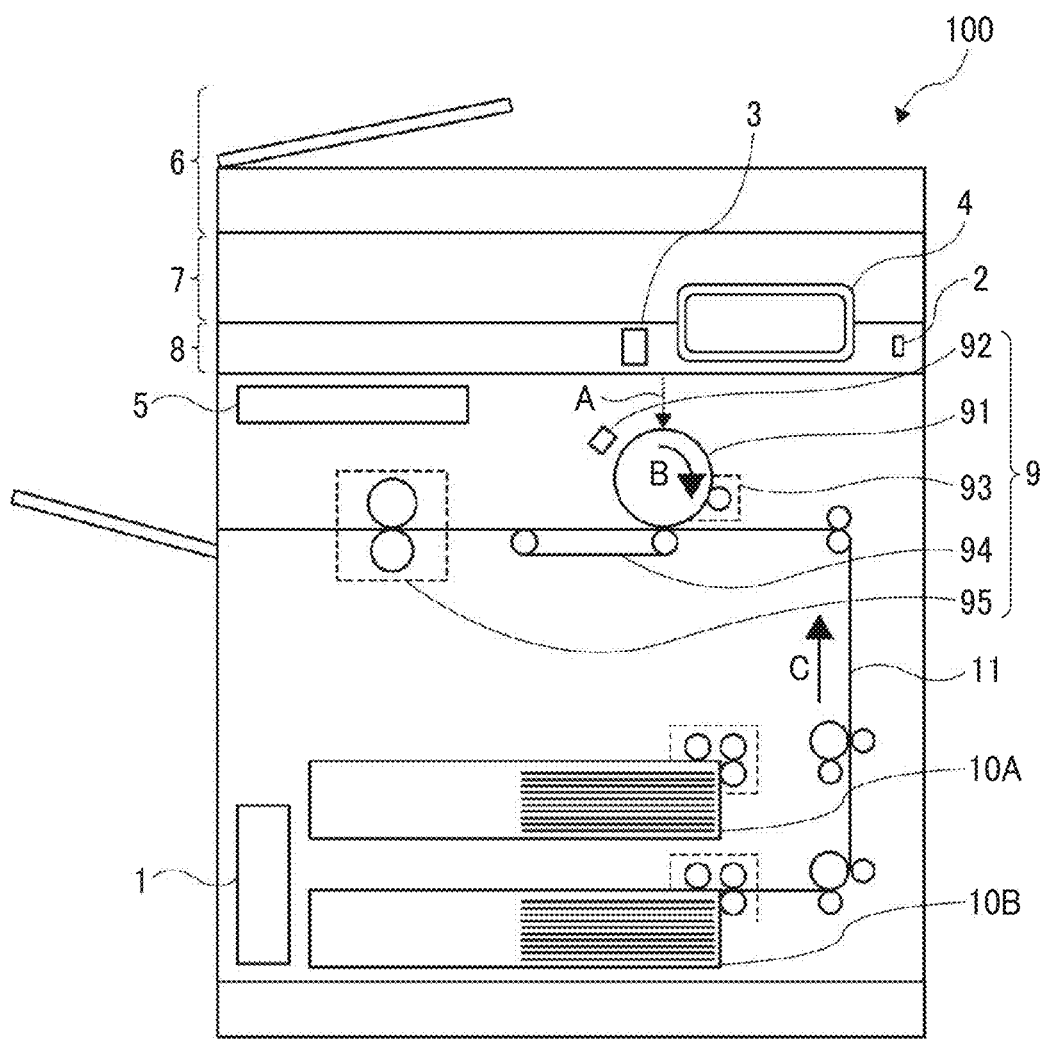
FIG. 1 is a schematic view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure will be described with reference to the attached drawings. In the present specification and drawings, constituent elements having substantially the same functional configurations are denoted by the same reference numerals to omit redundant description.

Embodiments of the present disclosure are described below with reference to the attached drawings. Referring now to the drawings, wherein like reference numerals designate identical or corresponding parts throughout the several views thereof, an image forming apparatus according to an embodiment of the present disclosure is described.

FIG. 1 is a block diagram of an image forming apparatus according to the present embodiment. FIG. 1 is also a side view partially transparently illustrating the inside of the image forming apparatus.

The image forming apparatus 100 is a multifunction peripheral or printer (MFP) having, for example, a copy function, a fax function, a print function, a scanner function, and functions of storing and distributing an input image (an original document read by the scanner function or an image input by the printer function or the fax function). The image forming apparatus 100 can also communicate with an external device, such as a personal computer (PC), and can perform an operation according to an instruction received from the external device. In the present embodiment, the "image" processed by the image forming apparatus 100 includes not only image data but also data not including image data, that is, data including only text information.

The image forming apparatus 100 is an electrophotographic image forming apparatus that charges a surface of a photoconductor, selectively exposes the surface of the photoconductor with light to write an electrostatic latent image, causes toner to be attached to the electrostatic latent image, and transfers the attached toner onto a recording medium, such as a sheet of paper.

As illustrated in FIG. 1, the image forming apparatus 100 includes a power supply unit (PSU) 1, a start switch 2, a card reader 3, an operation unit 4, a controller 5, an auto document feeder 6, an image reading device 7, a writing unit 8, a printer unit 9, a sheet feed cassette 10A, a sheet feed cassette 10B, and a conveyance path 11. The PSU 1 acts as a main power supply being a power supply device. The start switch 2 starts the image forming apparatus 100. The card reader 3 is for logging in to the image forming apparatus 100. The operation unit 4 is for inputting an operation to the image forming apparatus 100. The controller 5 controls the image forming apparatus 100 based on, for example, an operation input of the operation unit 4. The ADF 6 feeds an original document. The image reading device 7 reads an image of the document fed from the ADF 6. The writing unit 8 writes a latent image corresponding to the image read by the image reading device 7 onto the photoconductor. The printer unit 9 forms an image on a recording medium, such as a sheet of paper, according to the latent image written by the writing unit 8. The sheet feed cassette 10A and the sheet feed cassette 10B store recording media. The recording media stored in the sheet feed cassette 10A and the sheet feed cassette 10B are conveyed to the printer unit 9 along the conveyance path 11. The PSU 1, the controller 5, the printer unit 9, the sheet feed cassette 10A, the sheet feed cassette 10B, and the conveyance path 11 are disposed inside an exterior of the image forming apparatus 100. FIG. 1 transparently illustrates the insides of such components.

The PSU 1 as an example of the power supply device converts power from a commercial power supply when needed and supplies the converted power to each unit in the image forming apparatus 100 as a supply destination device.

When the user presses the start switch 2 in a state in which the power of the image forming apparatus 100 is off, the image forming apparatus 100 is started. When the user presses the start switch 2 down in a state in which the image forming apparatus 100 is activated, that is, in a state in which the power of the image forming apparatus 100 is on, the image forming apparatus 100 is turned off. As described above, the image forming apparatus 100 may be turned on and off by the user pressing the start switch 2. However, the configuration of turning on and off the image forming apparatus 100 is not limited to such a configuration. For example, the image forming apparatus 100 may be turned on and off based on an instruction received from an external device.

The card reader 3 is a card reader that reads, for example, an integrated circuit (IC) card of a user who can use the image forming apparatus 100. Based on readings of the card reader 3, the image forming apparatus 100 permits an authorized user to log-in and use.

The operation unit 4 includes, for example, a touch panel and receives an operation by, for example, a user or a customer engineer and information input through the operation.

The controller 5 generally controls the image forming apparatus 100. For example, the controller 5 causes the image forming apparatus 100 to execute an operation according to user's operation or information received by the operation unit 4. As another example, when a specific condition, for example, the pressing of the start switch 2 is detected, or as still another example, when an abnormality occurring in the image forming apparatus 100 is detected, the controller 5 causes the image forming apparatus 100 to execute an operation determined in advance.

An example of the controller 5 is a board mounted with a circuit that generally controls the image forming apparatus 100. A central processing unit (CPU), a read only memory (ROM), and a random access memory (RAM) are mounted on the circuit. The CPU executes programs stored in the ROM or a hard disk drive (HDD) while using the RAM as a work area to control the image forming apparatus 100.

The ADF 6 feeds the document placed on the ADF 6 to the image reading device 7. When a document bundle consisting of a plurality of documents is placed, the documents are sequentially fed one by one to the image reading device 7.

The image reading device 7 optically reads image information of the document fed by the ADF 6.

The writing unit 8 exposes the charged surface of the photoconductor in accordance with image information read by the ADF 6 and the image reading device 7 or other image information instructed by an external device for printing, and writes an electrostatic latent image onto the photoconductor.

The printer unit 9, which is an image forming device, includes a photoconductor drum 91 as the photoconductor, a charging device 92, a developing device 93, a conveyance belt 94, and a fixing device 95. The charging device 92 charges the outer surface of the photoconductor drum 91. The developing device 93 develops with toner a latent image written on the charged photoconductor drum 91. The conveyance belt 94 conveys a recording medium on which a toner image is formed. The fixing device 95 fixes toner on the recording medium to form the toner image on the recording medium.

The sheet feed cassettes 10A and 10B store recording media on which image formation is to be performed. In FIG. 1, the image forming apparatus 100 includes the two sheet feed cassettes 10A and 10B as an example and recording media of different sizes are stored in the sheet feed cassettes 10A and 10B. In some embodiments, the number of sheet feed cassettes may be one, or three or more.

The conveyance path 11 is provided with various rollers to convey recording media stored in the sheet feed cassette 10A and the sheet feed cassette 10B to the printer unit 9.

Here, the flow of image formation in the image forming apparatus 100 is described using a copy mode as an example. First, the user can operate, for example, a function switching key through the operation unit 4 to switch and select in turn the copy function, the printer function, and the facsimile function of the image forming apparatus 100 to perform each function. The copy mode is set when the copy function is selected, the printer mode is set when the printer function is selected, and the facsimile mode is set when the facsimile function is selected.

In the copy mode, a bundle of documents placed on the ADF 6 is conveyed one by one in turn and image information of each document is read.

The outer circumferential surface of the photoconductor drum 91 is uniformly charged by the charging device 92 in the dark and then exposed with emission light from the writing unit 8 (indicated by arrow A in FIG. 1). As a result, an electrostatic latent image is formed on the outer circumferential surface of the photoconductor drum 91. The developing device 93 visualizes the electrostatic latent image with toner. Thus, a toner image is formed on the photoconductor drum 91. The toner image formed on the photoconductor drum 91 is transferred to the recording medium on the conveyance belt 94. The fixing device 95 melts the toner of the toner image on the recording medium, fixes the toner image on the recording medium, and discharges the recording medium from the image forming apparatus 100.

Although the case where the printer unit 9 forms an image by a monochrome electrophotographic system is described above, the image forming system is not limited to such a monochrome electrophotographic system but may be, for example, a color electrophotographic system, an inkjet system, or any other image forming system.

In addition, the operation unit 4 described above may be controlled by the controller 5 or may be controlled by another control circuit that controls the operation unit 4 separately from the controller 5. In such a case, for example, the control circuit of the controller 5 and the control circuit of the operation unit 4 are communicably connected to each other, and the controller 5 controls the entire image forming apparatus 100 including the operation unit 4.

Figure 2:
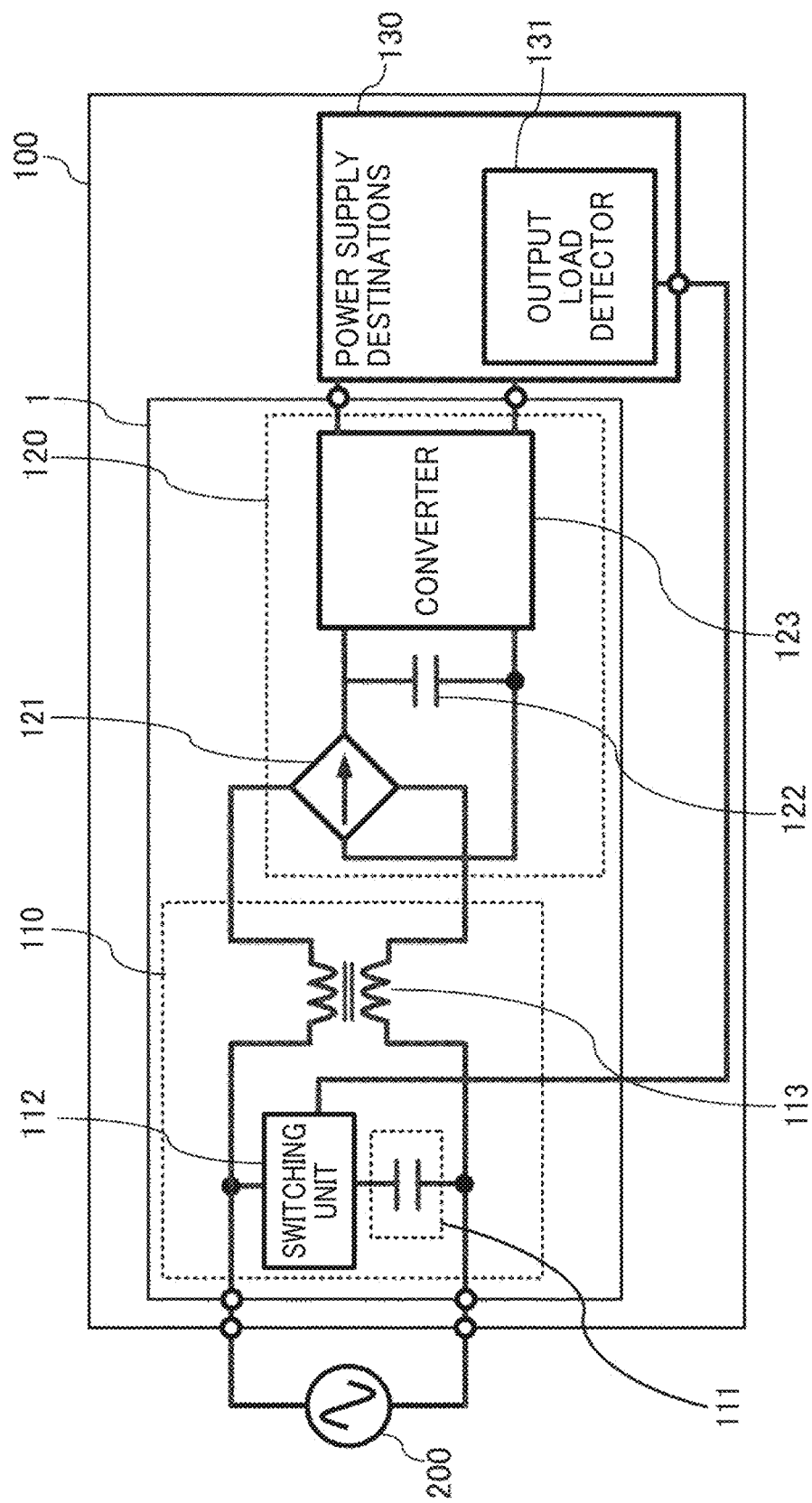
FIG. 2 is a block diagram of a power supply device according to an embodiment of the present disclosure.

FIG. 2 is a block diagram of the power supply device. The PSU 1 illustrated in FIG. 2 includes a filter circuit 110 and an AC/DC (direct current) conversion unit 120. The filter circuit 110 removes noise superimposed on the commercial power supply 200. The filter circuit 110 includes a capacitor unit 111 and a switching unit 112. The filter circuit 110 may further includes a common coil unit 113.

The capacitor unit 111 removes noise superimposed on the commercial power supply 200. Therefore, the capacitor unit 111 employs a capacitor having a capacity capable of removing noise superimposed on the commercial power supply 200 in the largest power state used by the image forming apparatus 100. In the present embodiment, a film capacitor having a relatively large capacity is used as the capacitor unit 111. The capacitor unit 111 removes normal mode noise and may be called an X capacitor.

The switching unit 112 includes, for example, a switch to switch connection of a circuit, and switches the capacity of the capacitor unit 111.

The common coil unit 113 removes common mode noise from noise superimposed on the commercial power supply 200 and may be called a common mode choke coil.

The AC/DC conversion unit 120 converts an AC voltage of the commercial power supply 200 into a DC voltage. The AC/DC conversion unit 120 includes a diode bridge 121, a capacitor 122, and a converter 123.

The diode bridge 121 is a diode bridge that rectifies an AC input voltage after noise removal by the filter circuit 110. The capacitor 122 is a smoothing capacitor that smooths the voltage rectified by the diode bridge 121. A large capacity capacitor is used as the capacitor 122. The converter 123 converts the voltage smoothed by the capacitor 122 into a desired DC voltage.

After the processing by the converter 123, power is supplied from the PSU 1 to power supply destinations 130 in the image forming apparatus 100. The power supply destinations 130 are units necessary for an operation being performed by the image forming apparatus 100 at that time, and are, for example, units in the image forming apparatus 100 to which power is supplied from a power supply unit, a controller of the printer unit 9, and motors for driving parts of the printer unit 9.

Each power supply destination 130 includes an output load detector 131. The output load detector 131 detects the output load of the entire power output to each power supply destination according to the operation of the image forming apparatus 100. The output load detector 131 determines the degree of the output load and outputs a switching signal of the capacitor capacity of the capacitor unit 111 to the switching unit 112 according to the determination result.

For example, the output load detector 131 outputs the switching signal to the switching unit 112 so that the capacity of the capacitor unit 111 is large (hereinafter referred to as large capacity state) when the output load to each power supply destination 130 is high (hereinafter may be referred to as high output load state) and so that the capacitor capacity of the capacitor unit 111 is small (hereinafter referred to as small capacity state) when the output load is low (hereinafter referred to as low output load state).

Such a configuration allows the PSU 1 to further reduce the power loss in the filter circuit 110. That is, the filter circuit 110 of the PSU 1 removes noise in the operating state where the output load is the highest with respect to the image forming apparatus 100 to which the power is supplied. Therefore, the capacitor capacity of the filter circuit 110 is set corresponding to the state where the output load is the highest. By contrast, in a non-operating state such as a sleep mode of the image forming apparatus 100, the output load is low and the degree of the superimposed noise is also low. Accordingly, the capacitor capacity that can handle low output load states may be lower. Thus, the image forming apparatus 100 according to the present embodiment includes the filter circuit including the capacitor unit and the switching unit to switch the capacitor capacity of the capacitor unit, thus reducing the power loss of the filter circuit. More specifically, in accordance with the output load output from the PSU 1, for example, the capacitor capacity may be switched when the output load is large.

Figure 3:
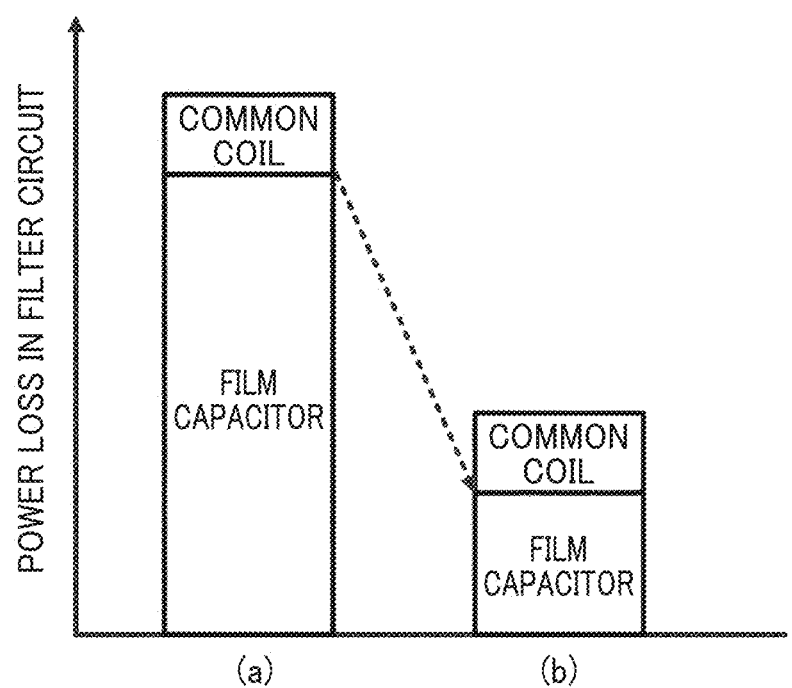
FIG. 3 is an explanatory diagram of power loss in a filter circuit.

FIG. 3 is a graph of power loss in the filter circuit unit. Bar (a) of FIG. 3 represents a comparative example of power loss in the non-operating state before applying the present embodiment. When the capacitor capacity is set low in the present embodiment, the film capacitor has a low capacity as illustrated in bar (b) of FIG. 3, thus allowing reduction of the power loss of the entire filter circuit.

Here, in order to reduce the power loss of the filter circuit with a filter circuit having a film capacitor and a common coil, for example, it is conceivable to use a circuit capable of bypassing the common coil. However, the power consumption differs between the common coil and the film capacitor. As an example, in the non-operating state such as the energy saving mode or the standby mode, the film capacitor is about 0.03 W while the common coil is about 0.0001 W. Accordingly, the power loss is also smaller in the common coil than in the film capacitor as illustrated in FIG. 3. Therefore, the method of switching the capacitor capacity of the filter circuit as in the present embodiment is more effective in reducing the power loss than the method of bypassing the common coil.

Figure 4:
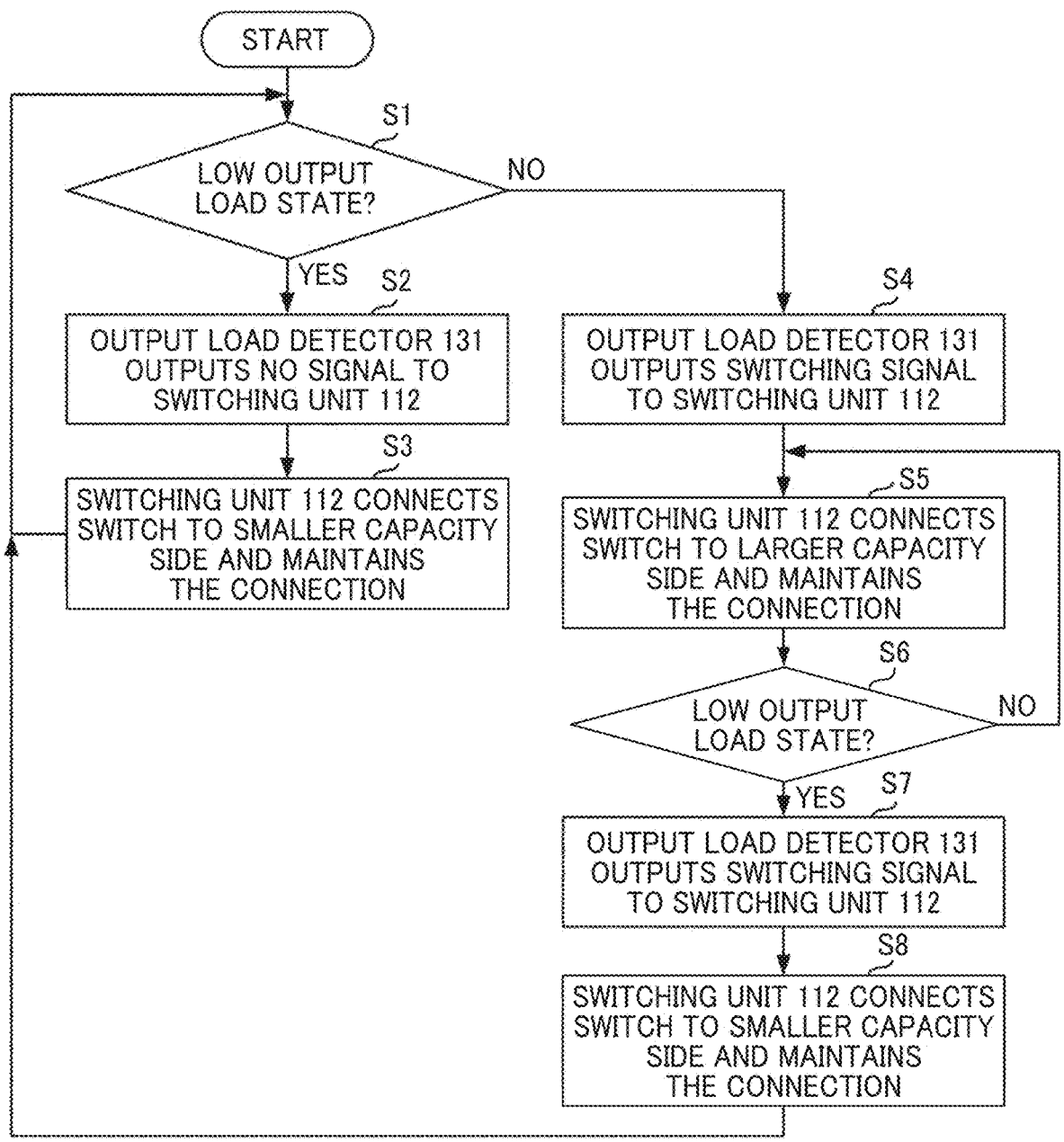
FIG. 4 is a flowchart of power supply processing according to an embodiment of the present disclosure.

FIG. 4 is a flowchart of the operation in the present embodiment.

The output load detector 131 determines whether it is in the low output load state (step S1). In the low output load state, the output load detector 131 does not output the switching signal to the switching unit 112 (step S2) and maintains the state in which the switching unit 112 connects the switch to a smaller capacity side (step S3).

On the other hand, if it is not in the low output load state in step S1, the output load detector 131 determines that it is in the high output load state (step S4) and outputs the switching signal to the switching unit 112 (step S4). Then, the switching unit 112 switches and connects the switch to a larger capacity side to maintain the state (step S5).

Next, the output load detector 131 determines whether it is in the low output load state (step S6). If it is in the low output load state (YES at step S6), the output load detector 131 outputs a switching signal to the switching unit 112 (step S7). The switching unit 112 switches and connects the switch to the smaller capacity side to maintain the state (step S8) and returns to step S1. Alternatively, if it is not in the low output load state at step S6 (NO), the process returns to step S5 and the switching unit 112 maintains the high output load state.

Here, a description is given of an example of a method of determining whether it is in the low output load state in steps S1 and S6 in FIG. 4.

As a first example, the state of the output load can be determined by the operating state of the image forming apparatus 100. Here, the operating state is a state in which the power consumption of the image forming apparatus 100 is largest. Since the power consumption is large, it can be determined to be in the high output load state. An example of the operating state is in a state in which printing or copying is being performed. On the other hand, the non-operating state is a state in which the power consumption is smaller than the power consumption in the operating state, that is, the low output load state when the operating state represents an available state in which the power consumption of the image forming apparatus 100 is largest. Examples of the non-operating state include a state in which a part of functions, such as the standby mode, the energy saving mode, and the sleep mode, are deactivated as well as the state in which the start switch 2 is off.

A second example is the amount of noise superimposed on the output power from a commercial power supply. The amount of noise can also be referred to as the amount of high frequency components included in the output power. Since the amount of noise to be superimposed tends to increase as the output increases, whether the output load is in the low output load state can be determined based on whether the amount of noise is equal to or less than a predetermined amount.

As a third example, the state of output load can be determined based on whether a drive signal of a motor for driving a roller of the conveyance path 11 is output. If the roller of the conveyance path 11 is driven, printing or copying are being performed, which indicates the high output load state. Therefore, if the drive signal of the roller of the conveyance path 11 is not output, it can be determined to be in the low output load state. The determination may be made based on the presence or absence of the output of the drive signal to each member of the printer unit 9. Alternatively, a drive start signal to a motor having a large output load capacity may be detected among motors of the image forming apparatus 100.

FIGS. 5A to 5D are examples of the configuration of the filter circuit. In FIGS. 5A to 5D, the switching unit 112 includes a selector switch that switches circuits.

Figure 5A:
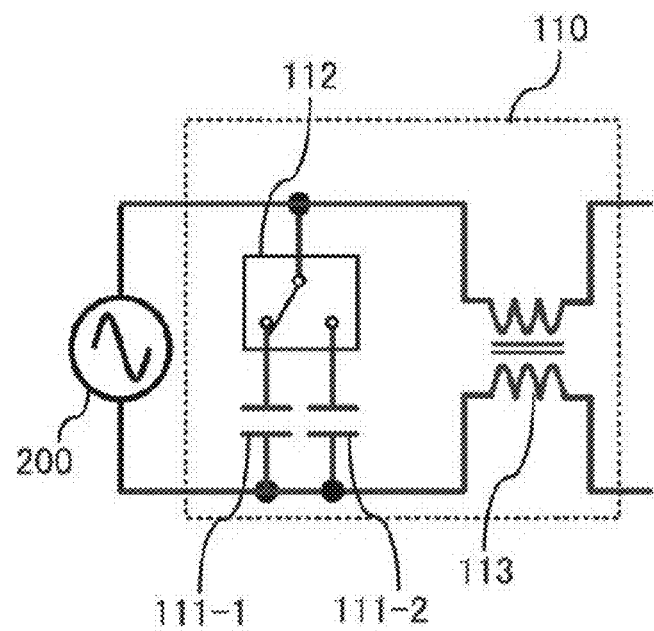
FIGS. 5A to 5D are schematic views of examples of a configuration of the filter circuit.
Figure 5B:
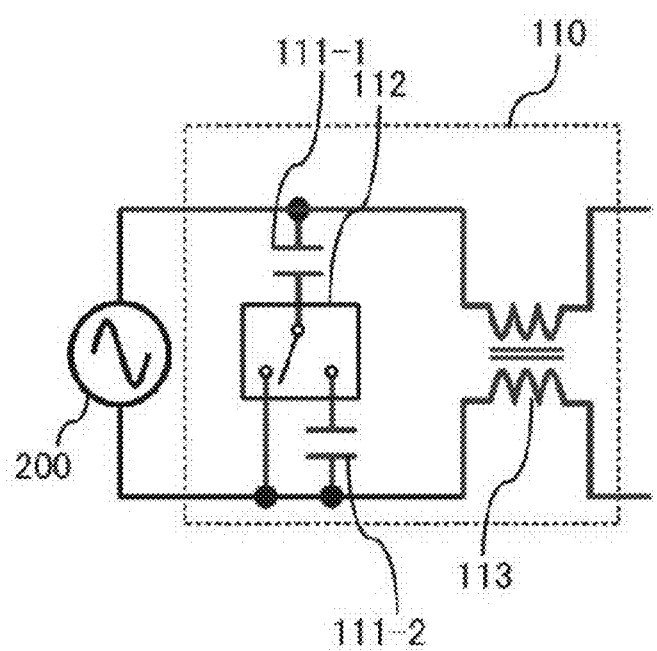
Figure 5C:
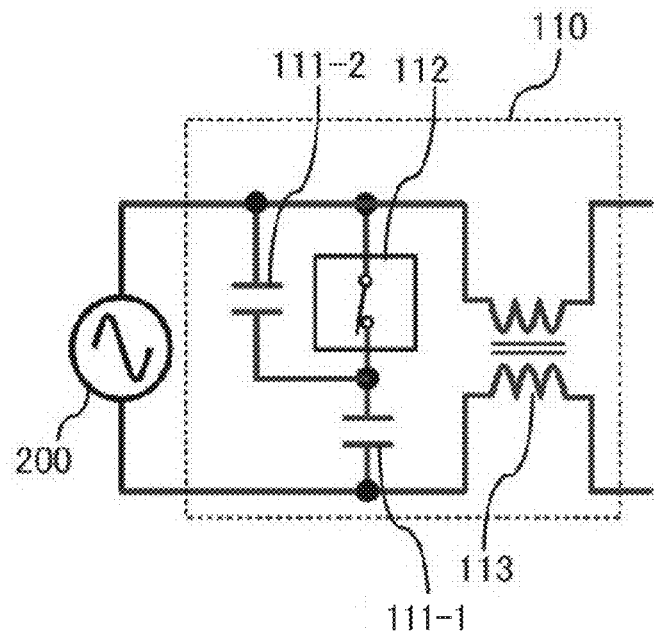

FIGS. 5A, 5B, and 5C illustrate examples in which the capacitor unit 111 includes two capacitors 111-1 and 111-2. The capacitor 111-1 has a capacity capable of removing noise superimposed on an input power supply from the commercial power supply 200 in the high output load state. The capacity of the capacitor 111-1 is larger than the capacity of the capacitor 111-2.

Figure 5D:
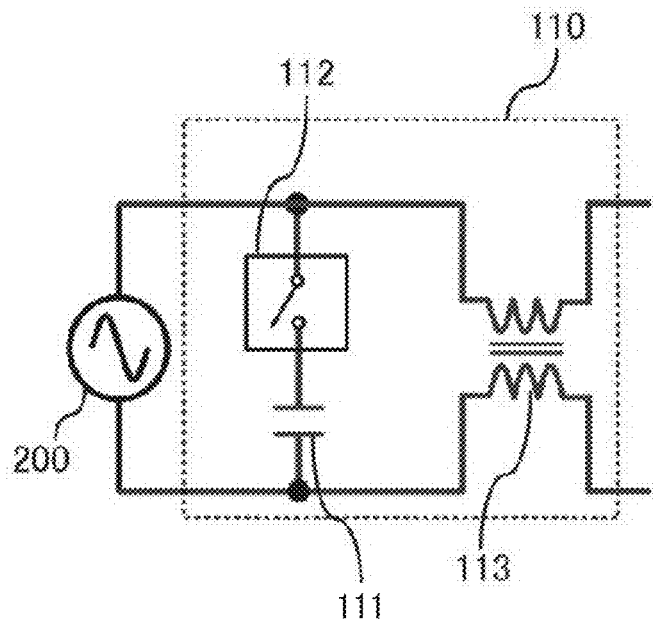

FIG. 5D illustrates an example in which the capacitor unit 111 includes one capacitor. The capacitor of the capacitor unit 111 illustrated in FIG. 5D has a capacity capable of removing noise superimposed on the input power supply from the commercial power supply 200 in the high output load state.

In FIG. 5A, a state in which the switch is connected to the left represents a large capacity state, and a state in which the switch is connected to the right represents a small capacity state.

In FIG. 5B, a state in which the switch is connected to the left represents a large capacity state, and a state in which the switch is connected to the right represents a small capacity state.

In FIG. 5C, a state in which the switch is connected represents a large capacity state, and a state in which the switch is separated represents a small capacity state.

In FIG. 5D, a state in which the switch is connected represents a large capacity state, and a state in which the switch is separated represents a small capacity state.

The capacitor unit 111 includes a plurality of capacitors and switch the connection to the plurality of capacitors to switch the capacitor capacity. The capacitor unit 111 includes one capacitor and switches the connection to the one capacitor to switch the capacitor capacity.

When the output load is high, the output load detector 131 outputs the switching signal to the switching unit 112 so as to be in the low capacity state in each of the above-described configurations of FIGS. 5A to 5D, thus allowing reduction of power loss of the filter circuit 110.

An example of the selector switch of the switching unit 112 is a mechanical switch. For the mechanical switch, the standby power as a component is low, which is advantageous in reducing power loss. Another example is a semiconductor switch. The semiconductor switch has a small size as a component, which is advantageous in downsizing.

Although some embodiments of the present disclosure were described above, embodiments of the present disclosure are not limited to the above-described embodiments. Various modifications and changes are possible within the range of the gist of the present disclosure recited in appended claims.

The invention claimed is:

1. A power supply device connectable to a commercial power supply to output power to a supply destination device, the power supply device comprising:
   a filter circuit including a capacitor unit including at least a first capacitor; and
   a switch connected to the capacitor unit, the switch configured to vary a capacitance of the capacitor unit by selectively connecting the switch and the first capacitor in series between a first input node of a common coil of a choke and a second input node of the common coil of the choke such that the first capacitor is in parallel between the first input node and the second input node of the common coil of the choke, the common coil configured to remove common mode noise from input power by blocking common mode currents included in the input power from passing to the supply destination device.

2. The power supply device according to claim 1, wherein the switch is configured to vary the capacitance of the capacitor unit in accordance with a magnitude of noise superimposed on the input power input from the commercial power supply to the filter circuit.

3. The power supply device according to claim 1, wherein the switch is configured to vary the capacitance of the capacitor unit in accordance with a magnitude of a high frequency component superimposed on input power input from the commercial power supply.

4. The power supply device according to claim 1, wherein the switch is configured to vary the capacitance of the capacitor unit in accordance with an output load of the power output from the commercial power supply.

5. The power supply device according to claim 4, wherein the switch is configured to vary the capacitance of the capacitor unit such that the capacitance increases when the output load is larger than a threshold.

6. The power supply device according to claim 1, wherein the filter circuit is configured to remove noise contained in input power input from the commercial power supply to the power supply device.

7. The power supply device according to claim 1, further comprising:

an output load detector configured to detect the power output from the commercial power supply.

8. The power supply device according to claim 7, wherein the output load detector is configured to,
   detect an amount of noise superimposed on the commercial power supply, and
   instruct the switch to connect the first capacitor in parallel to the common coil in response to detecting that the amount of noise is above a threshold.

9. The power supply device according to claim 7, wherein the output load detector is configured to,
   detect a drive start signal for a motor having a larger output load capacity among motors of the supply destination device, and
   instruct the switch to connect the first capacitor in parallel to the common coil in response to detecting that the drive start signal.

10. The power supply device according to claim 7, wherein the output load detector is configured to,
    detect whether the supply destination device is in a non-operation state or an operation state, and
    instruct the switch to connect the first capacitor in parallel to the common coil in response to detecting that the supply destination device is in the operation state.

11. The power supply device according to claim 7, wherein the supply destination device is an image forming apparatus having an image forming function, and
    wherein the output load detector is configured to,
    detect whether the image forming function is being executed, and
    instruct the switch to connect the first capacitor in parallel to the common coil in response to detecting that the image forming function is being executed.

12. The power supply device according to claim 1, further comprising:
    a mechanical switch configured to vary the capacitance of the capacitor unit.

13. The power supply device according to claim 1, further comprising:
    a semiconductor switch configured to vary the capacitance of the capacitor unit.

14. An image forming apparatus comprising:
    the power supply device according to claim 1,
    wherein the image forming apparatus is the supply destination device.

15. The power supply device according to claim 1, wherein the first capacitor is a film capacitor including an insulating plastic film as a dielectric.

16. The power supply device according to claim 1, wherein first capacitor has a first capacitance, and the capacitor unit further includes a second capacitor having a second capacitance smaller than the first capacitance.

17. The power supply device according to claim 16, wherein the switch is configured to switch the capacitance of the capacitor unit by selectively connecting one of the first capacitor and the second capacitor in parallel to the common coil.

18. A power supply device connectable to a commercial power supply to output power to a supply destination device, the power supply device comprising:
    a filter circuit including a capacitor unit including at least a first capacitor; and
    switching means connected to the capacitor unit, the switching means for varying a capacitor capacity of the capacitor unit by selectively connecting the switching means and the first capacitor in series between a first input node of a common coil of a choke and a second input node of the common coil of the choke such that the first capacitor is in parallel to between the first input node and the second input node of the common coil of the choke, the common coil configured to remove common mode noise from input power by blocking common mode currents included in the input power from passing to the supply destination device.

19. A power supply device connectable to a commercial power supply to output power to a supply destination device, the power supply device comprising:
    a filter circuit including a capacitor unit including at least a first capacitor; and
    a switch connected to the capacitor unit such that the switch and the first capacitor are selectively connected in series between a first input node of a common coil and a second input node of the common coil, the switch configured to vary a capacitance of the capacitor unit by selectively connecting the first capacitor in parallel to between the first input node and the second input node of the common coil.

* * * * *